April 15, 1958 P. RAINVILLE ET AL 2,830,592
POTATO VINER
Filed July 19, 1956 3 Sheets-Sheet 2

INVENTORS
PAUL RAINVILLE
PERCY LANGDON
BY H.S. Hendry
ATTORNEY

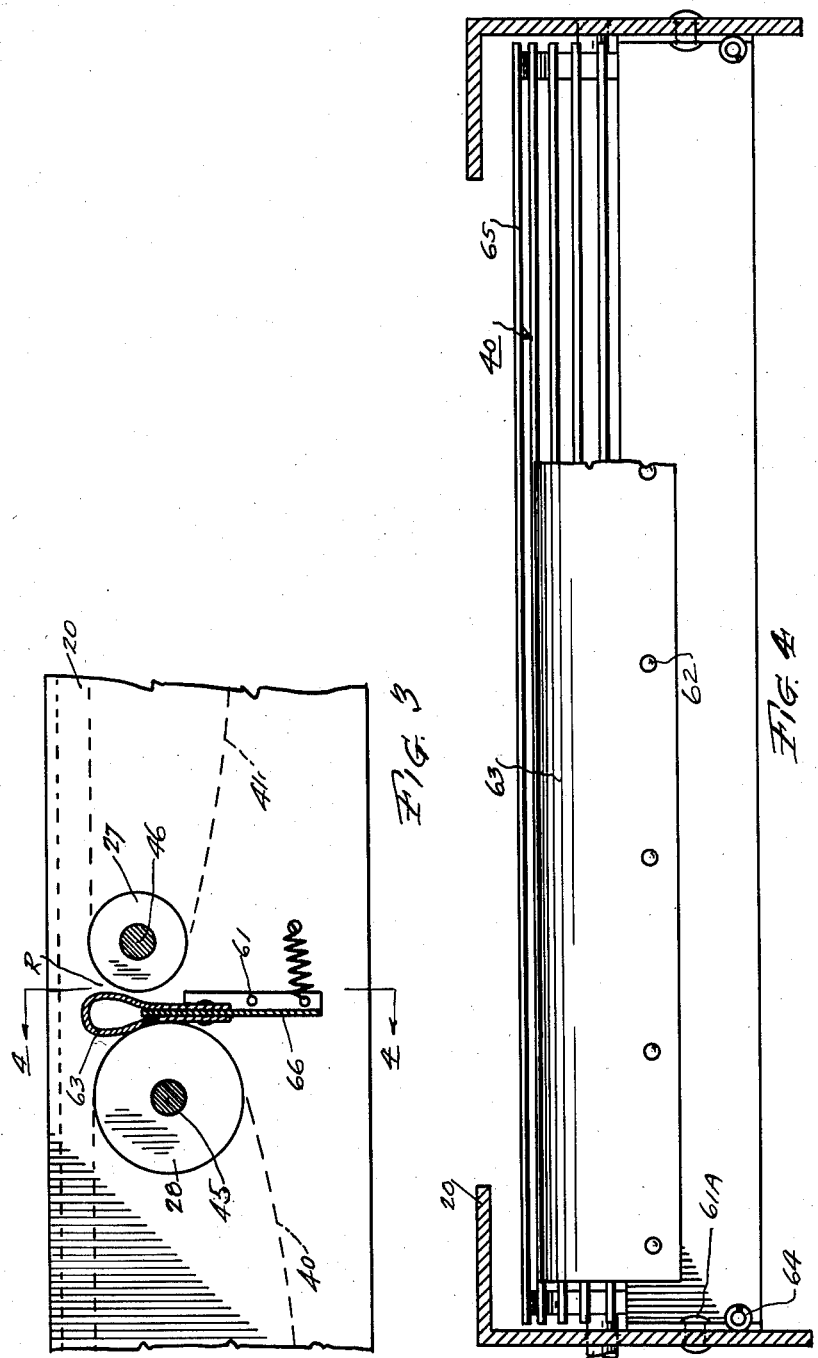

United States Patent Office 2,830,592
Patented Apr. 15, 1958

2,830,592

POTATO VINER

Paul Rainville, Chelmsford, Ontario, and Percy Langdon, Val Caron, Ontario, Canada Application July 19, 1956, Serial No. 598,965

2 Claims. (Cl. 130—30)

This invention relates to a digger and picker potato combine.

A machine according to the present invention is of the type wherein potatoes are dug out of the ground and conveyed to a bag carried at the rear of the machine.

More particularly, the invention relates to a machine of the type described, wherein novel and efficient means are provided for separating the potatoes from the stems as the potatoes are conveyed toward the bag.

The principal object of the invention, therefore, is to provide novel and efficient means for severing the stems from the potatoes.

Another object of the invention is to provide in a machine of the type described, novel and efficient means for severing the stems from the potatoes as they are conveyed toward the bag, and discarding such stems before the potatoes (minus the stems) are dropped into the bag.

In the drawings, wherein like numerals of reference indicate corresponding parts in the various figures, Figure 1 is a side elevation of the machine;

Figure 3 is a fragmentary longitudinal vertical section on an enlarged scale; and, Figure 4 is a section on line 4—4 in Figure 3.

Figure 1:
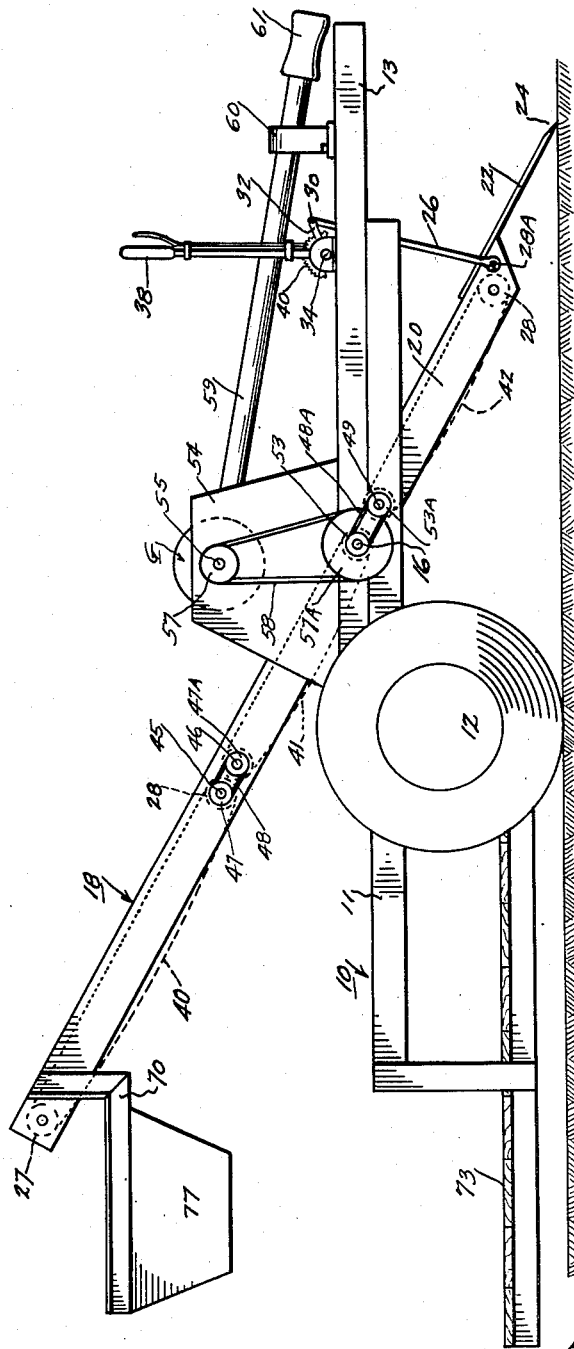

In the drawings there is shown, more or less diagrammatically, a conventional digger and picker potato combine, to which the novel stem-severing means are applied.

Referring now by numerals to the drawings, 10 shows a rigid frame of which 11 are its two side members or sills, suitably supported on a pair of wheels 12. The frame includes a V-shaped boom 62 formed of two angles 13 extending forwardly from the side sills 11 and secured together at their forward extremities.

The forward end of the boom 62 is provided with suitable means (not shown) for pivotal connection to the draw bar of a conventional tractor (not shown). The frame 10 of the machine is in substantially horizontal, operative position when the boom is operatively connected to the draw bar of the tractor.

Preferably, such conventional machine (more particularly the conveyor system) is such that the centre of gravity of the conveyor lies closely to the axis of the two supporting wheels 12, but slightly in advance of such axis, so that little bending moment will be imposed upon the boom.

Figure 2:
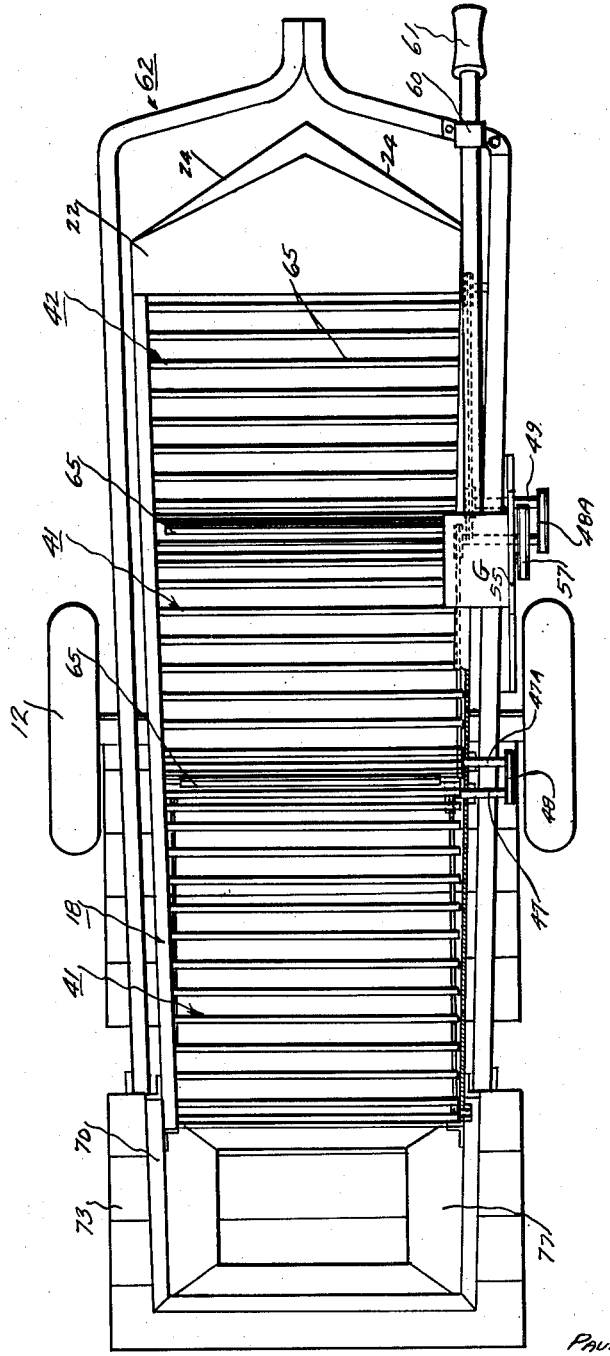
Figure 2 is a plan view of Figure 1.

Pivotally supported by the frame 10 as on a shaft 16 journalled in suitable bearings (not shown) supported by the side sills of the boom, is a conveyor frame 18, which includes side longitudinal members or angles 20. The members 20 are held in spaced relationship at their forward end by a plate 22 rigidly secured to the members. The plate is formed with two relatively angularly disposed forward edges 24 (see Figure 2), and serves as what is called a "digger point."

On the frame 20 are mounted a plurality of endless conveyors (to be referred to presently). The conveyor frame 20 is adjustable on the axis of the shaft 16 to present the tip or forward end of the digger point closer or farther away from the ground. Thus, as shown, links 26 are pivotally connected at one end as at 28A, to the side members of the conveyor frame, and at its other end as at 30, to the ends of levers 32 fixed to a shaft 34 journalled in suitable brackets supported by the boom. Fixed to one end of the shaft 34 is a latch-controlled lever 38 cooperating with a toothed quadrant 40 fixed to one of the side sills of the boom. The angular position of the conveyor frame is thus adjustable by the lever 38.

The endless conveyors—preferably three in number—are shown at 40, 41 and 42. All three such conveyors may be of a conventional design, such as used in conventional potato digging machines; they are usually called "bar conveyors." Such conveyor, as the term implies, includes spaced rods 65 assembled in spaced parallel relationship as by double-eyed links, to form the belt or conveyor proper.

The belt of each conveyor is trained around rearward and forward drums 28 and 27, respectively, see Figure 3. (For purposes of the present invention, the forward drums are of a diameter larger than that of the rearward drums.) The drums are fixed to shafts journalled in the conveyor frame. Turning with the drums are sprockets.

Fixed to a shaft 45 on which the rearward drum 28 of the rear conveyor 40 is mounted is a sprocket 47. Fixed to a shaft 46 on which the forward drum 27 of the intermediate conveyor 41 is mounted, is a sprocket 47A. As the drum 27 is preferably of a diameter smaller than that of the drum 28, the relative diameters of the sprockets 47—47A (for convenience shown in Fig. 1 as of the same diameter) are such that the drums rotate at a same peripheral speed. Fixed to the shaft 16 aforesaid, on which the rearward drum 28 of the conveyor 41 is mounted, is a sprocket 53. Fixed to a shaft 49 on which the rearward drum of the conveyor 42 is mounted, is a sprocket 53A. Likewise, the relative diameters of the sprockets 53—53A are such that the drums rotate at a same peripheral speed. The sprockets 47—47A are coupled by a sprocket chain 48; and likewise, the sprockets 53—53A are coupled by a sprocket chain 48A. Thus, it will be seen that all three conveyors proper or belts are actuated simultaneously as one.

Journalled in upright plates 54 rising from the sides of the machine frame 10 is a transverse shaft 55, to one end (the front end) of which is fixed a sprocket 57. A sprocket chain 58 is trained between the sprocket 57 and a sprocket 57A fixed to the shaft 16. Operatively coupled to the front end of the transverse shaft 55 is a conventional gear box G including intermeshing gears (not shown) fixed, respectively, to the shaft 55 and a shaft 59 that is suitably journalled at its forward end in a bearing 60 carried by the boom. The forward end of the shaft 59 carries a suitable universal coupling 61 for operative connection or coupling with the power takeoff of a tractor (not shown). Thus, the three conveyor units are actuated simultaneously from the power takeoff when the machine is coupled to the tractor, to be drawn thereby.

Fixed to the rear end of the rearward conveyor frame are brackets 70 from which a chute or funnel 77 is suspended. The funnel serves to direct the potatoes falling off the rear of the rearward conveyor, into a bag (not shown) supported on a platform 73 and suitably hung from the chute.

As the machine is drawn forwardly (by the tractor), the potatoes are dug out of the ground and are pushed up by the loose earth onto the digger plate 22 and onto the forward (lower) end of the forward conveyor 42. The conveyor raises the potatoes to the next conveyor 41, and thence to the rear conveyor 40, from which they fall into the chute. The stems severed from the potatoes fall to the ground.

The machine thus far described is more or less of conventional design, as already stated, and such conventional machine in operation transfers the potatoes from one conveyor to the other.

My invention resides in the means for severing the stems from the potatoes proper.

Such means are best shown in Figure 3. Between adjacent ends of two adjacent co-operating conveyors, a transverse plate 66 is pivotally supported by the conveyor frame side sills, as by pins or the like 61. Secured to the plate as by rivets 62, is a (preferably) leather looped web or member 63 extending upwardly to lie between adjacent ends of the two adjacent conveyors.

The web supporting plate 66 is spring-loaded, as by a tensioned coil spring 64, to be urged counterclockwise as seen in Figure 3, so that one run or side of the loop is urged against and is successively engaged by the rods of a conveyor, as the rods of such conveyor successively reach the end of their travel toward the adjacent end of a preceding conveyor. The web 63 and the adjacent rollers of the adjacent co-operating conveyors are such that a hollow or recess R is defined between the conveyor belts and a gap or space is provided between one run of the strap and a preceding drum, such that while the stems may fall into such gap, the gap is not wide enough to permit of the potatoes falling through to the ground. Moreover, the potatoes lying within the recess are agitated and turned about, tending to present the stems sideways (that is, transversely of the machine) and ultimately downwardly, and otherwise tending to pull the stems off the potatoes. By providing the novel stem-removing means between the adjacent ends of three conveyor units (in effect, two such sets of stem-removing means), it has been found that a very large majority of potatoes have their stems removed. In practice, and as shown in Figure 3, the looped web is of such length as to slightly extend above the plane of the effective carrying surfaces of the conveyors, and in effect temporarily impede the rearward displacement of the potatoes.

As the potatoes are carried on a conveyor and are transferred from such one conveyor to the next one, it is found that the stems of the potatoes are caught or tend to be caught between the conveyor and the web, and dragged or pulled downwardly. As the potato is too large to be dragged and carried downwardly with the stem, the result is that the stems are severed from the potatoes. The so-severed stems fall to the ground, and the potatoes are transferred from one conveyor to the next conveyor.

The embodiments of the invention in which an exclusive property or privilege is claimed are defined as follows:

1. In a machine of the kind described, including a preceding endless conveyor and a succeeding endless conveyor in series and spaced to define a gap therebetween not sufficient to allow the potato to fall therethrough so that they may be moved from one conveyor to the other, a pivotally-carried plate extending transversely of said conveyor, a member of pliable material carried by said plate and extending upwardly in the gap, and spring means biasing said plate so that said member engages the succeeding roller partially to close the gap.

2. A machine as in claim 1, wherein the member is made of rubber.

References Cited in the file of this patent

UNITED STATES PATENTS

| | | |
|---|---|---|
| 997,276 | Curtis | July 11, 1911 |
| 2,365,077 | Hertzler et al. | Dec. 12, 1944 |
| 2,438,500 | Hertzler | Mar. 30, 1948 |
| 2,739,694 | Hatch et al. | Mar. 27, 1956 |